United States Patent [19]

Moore et al.

[11] Patent Number: 5,848,283
[45] Date of Patent: Dec. 8, 1998

[54] METHOD AND SYSTEM FOR EFFICIENT MAINTENANCE OF DATA COHERENCY IN A MULTIPROCESSOR SYSTEM UTILIZING CACHE SYNCHRONIZATION

[75] Inventors: Charles Roberts Moore; John Stephen Muhich; Brian James Vicknair, all of Austin, Tex.

[73] Assignee: International Business Machines Corporation, Armonk, N.Y.

[21] Appl. No.: 10,900

[22] Filed: Jan. 29, 1993

[51] Int. Cl.$^6$ .................................................. G06F 13/00
[52] U.S. Cl. ........................ 395/800; 395/403; 395/468; 395/551; 364/134; 364/DIG. 1
[58] Field of Search .................... 395/800, 425, 395/650, 403, 468, 551; 364/DIG. 1, 134

[56] References Cited

U.S. PATENT DOCUMENTS

| | | | |
|---|---|---|---|
| 4,843,542 | 6/1989 | Dashiell et al. . | |
| 5,148,533 | 9/1992 | Joyce et al. | 395/425 |
| 5,193,186 | 3/1993 | Tamaki et al. | 395/650 |
| 5,210,848 | 5/1993 | Liu | 395/425 |
| 5,222,229 | 6/1993 | Fukuda et al. | 395/550 |
| 5,228,134 | 7/1993 | MacWilliams et al. | 395/425 |
| 5,276,828 | 1/1994 | Dion | 395/425 |
| 5,276,852 | 1/1994 | Callander et al. | 395/425 |
| 5,301,298 | 4/1994 | Kagan et al. | 395/425 |

OTHER PUBLICATIONS

Dubois et al., "Synchronization, Coherence, and Event Ordering in Multiprocessors", IEEE 1988, pp. 9–21.

Lee et al., "Synchronization With Multiprocessor Caches", IEEE Aug. 1990, pp. 27–37.

Yang et al., Analysis and Comparison of Cache Coherence Protocols for a Packet–Switched Multiprocessor, IEEE, 1989 pp. 1143–1153.

Michael Dubois, et al., "Delayed Consistency and Its Effects on the Miss Rate of Parallel Programs", Proceedings Supercomputing, Nov. 18, 1991, pp. 197–206.

*Primary Examiner*—Alyssa H. Dowler
*Assistant Examiner*—Dzung C. Nguyen
*Attorney, Agent, or Firm*—Andrew J. Dillon

[57] ABSTRACT

A method and system are efficiently maintaining data coherency in a multiprocessor data processing system having multiple processors coupled together via common bus. Each time an attempted modification is made to selected data by one of the processors, a multistate bus synchronization flag is established within the initiating processor. A bus operation request which is appropriate for the type of data modification is then issued from a cache associated with the initiating processor to a memory queue associated therewith. The bus operation request is then transmitted onto the common bus from the memory queue on an opportunistic basis, permitting additional cache operations to occur during the pendency of the bus operation request. A successful assertion of the bus operation request, indicating no coherency problems exist with respect to other processors, results in an alteration of the state of the multistate bus synchronization flag, permitting modification of the selected data. A failure to successfully assert the bus operation request will result in the automatic reissue of the bus operation request, greatly enhancing the ability of the system to maintain data coherency.

12 Claims, 6 Drawing Sheets

METHOD AND SYSTEM FOR EFFICIENT MAINTENANCE OF DATA COHERENCY IN A MULTIPROCESSOR SYSTEM UTILIZING CACHE SYNCHRONIZATION

BACKGROUND OF THE INVENTION

1. Technical Field

The present invention relates in general to enhanced data coherency in a data processing system and in particular to a method and system for enhanced data coherency in a multiprocessor data processing system. Still more particularly, the present invention relates to a method and system for maintaining data coherency in a multiprocessor data processor system utilizing cache synchronization.

2. Description of the Related Art

Designers of modern state-of-the-art data processing systems are continually attempting to enhance the performance aspects of such systems. One technique for enhancing data processing system efficiency is the achievement of short cycle times and a low Cycles-Per-Instruction (CPI) ratio. An excellent example of the application of these techniques to an enhanced data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a multiscalar implementation, which means that multiple instructions are issued and executed simultaneously.

The simultaneous issuance and execution of multiple instructions requires independent functional units that can execute concurrently with a high instruction bandwidth. The RS/6000 system achieves this by utilizing separate branch, fixed point and floating point processing units which are pipelined in nature. In such systems a significant pipeline delay penalty may result from the execution of conditional branch instructions. Conditional branch instructions are instructions which dictate the taking of a specified conditional branch within a application in response to a selected outcome of the processing of one or more other instructions. Thus, by the time a conditional branch instruction propagates through a pipeline queue to an execution position within the queue, it will have been necessary to load instructions into the queue behind the conditional branch instruction prior to resolving the conditional branch in order to avoid run-time delays.

Another source of delays within multiscalar processor systems is the fact that such systems typically execute multiple tasks simultaneously. Each of these multiple tasks typically has a effective or virtual address space which is utilized for execution of that task. Locations within such a effective or virtual address space include addresses which "map" to a real address within system memory. It is not uncommon for a single space within real memory to map to multiple effective or virtual memory addresses within a multiscalar processor system. The utilization of effective or virtual addresses by each of the multiple tasks creates additional delays within a multiscalar processor system due to the necessity of translating these addresses into real addresses within system memory, so that the appropriate instruction or data may be retrieved from memory and placed within an instruction queue for dispatching to one of the multiple independent functional units which make up the multiscalar processor system.

One technique whereby effective or virtual memory addresses within a multiscalar processor system may be rapidly translated to real memory addresses within system memory is the utilization of a so-called "translation lookaside buffer" (TLB). A translation lookaside buffer (TLB) is a buffer which contains translation relationships between effective or virtual memory addresses and real memory addresses which have been generated utilizing a translation algorithm. While the utilization of translation lookaside buffer (TLB) devices provides a reasonably efficient method for translating addresses, the utilization of such buffers in tightly coupled symmetric multiprocessor systems causes a problem in coherency. In data processing systems in which multiple processors may read from and write to a common system real memory care must be taken to ensure that the memory system operates in a coherent manner. That is, the memory system is not permitted to become incoherent as a result of the operations of multiple processors. Each processor within such a multiprocessor data processing system typically includes a translation lookaside buffer (TLB) for address translation and the shared aspect of memory within such systems requires that changes to a single translation lookaside buffer (TLB) within one processor in a multiprocessor system be carefully and consistently mapped into each translation lookaside buffer (TLB) within each processor within the multiprocessor computer system in order to maintain coherency.

The maintenance of translation lookaside buffer (TLB) coherency in prior art multiprocessor systems is typically accomplished utilizing interprocessor interrupts and software synchronization for all translation lookaside buffer (TLB) modifications. These approaches can be utilized to ensure coherency throughout the multiprocessor system; however, the necessity of utilizing interrupts and software synchronization results in a substantial performance degradation within a multiprocessor computer system.

Additionally, each processor within a multiprocessor data processing system typically includes a small specialized memory or "cache" which is preferably utilized to access data or instructions within system memory in a manner well known to those having skill in the art. The sizing and utilization of cache memory systems is a well known subspecialty within the data processing art and is not addressed within the present application. However, those skilled in the art will appreciate that by utilizing modern associative cache techniques, a large percentage of memory accesses within a system may be achieved utilizing data which is temporarily stored within a cache/memory interface.

One problem which occurs in multiprocessor systems wherein memory is distributed into smaller caches is that certain cache operations force a processor to flush and/or invalidate a block of data within its associated cache. In a single processor environment this is a relatively straightforward operation since the block of data may exist within only one of two places. That is, either within the cache or within main memory. However, in a multiprocessor environment these functions are complicated by the fact that other processors may have the same block of data within an associated cache and that block of data may be unaltered or altered. Thus, to ensure that cache operations within a multiprocessor environment are performed such that data integrity and coherency are maintained a multiprocessor system must provide a technique whereby synchronization may be accomplished throughout all processor caches and main memory within such a system.

Therefore, it should be obvious that a need exists for an efficient technique whereby data coherency within a multiprocessor data processing system may be maintained.

SUMMARY OF THE INVENTION

It is therefore one object of the present invention to provide enhanced data coherency in a data processing system.

It is another object of the present invention to provide an improved method and system for enhanced data coherency in a multiprocessor data processing system.

It is yet another object of the present invention to provide an improved method and system for maintaining data coherency in a multiprocessor data processing system utilizing cache synchronization.

The foregoing objects are achieved as is now described. The method and system of the present invention may be utilized to efficiently maintain data coherency in a multiprocessor data processing system having multiple processors coupled together via common bus. Each time an attempted modification is made to selected data by one of the processors, a multistate bus synchronization flag is established within the initiating processor. A bus operation request which is appropriate for the type of data modification is then issued from a cache associated with the initiating processor to a memory queue associated therewith. The bus operation request is then transmitted onto the common bus from the memory queue on an opportunistic basis, permitting additional cache operations to occur during the pendency of the bus operation request. A successful assertion of the bus operation request, indicating no coherency problems exist with respect to other processors, results in an alteration of the state of the multistate bus synchronization flag, permitting modification of the selected data. A failure to successfully assert the bus operation request will result in the automatic reissue of the bus operation request, greatly enhancing the ability of the system to maintain data coherency.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
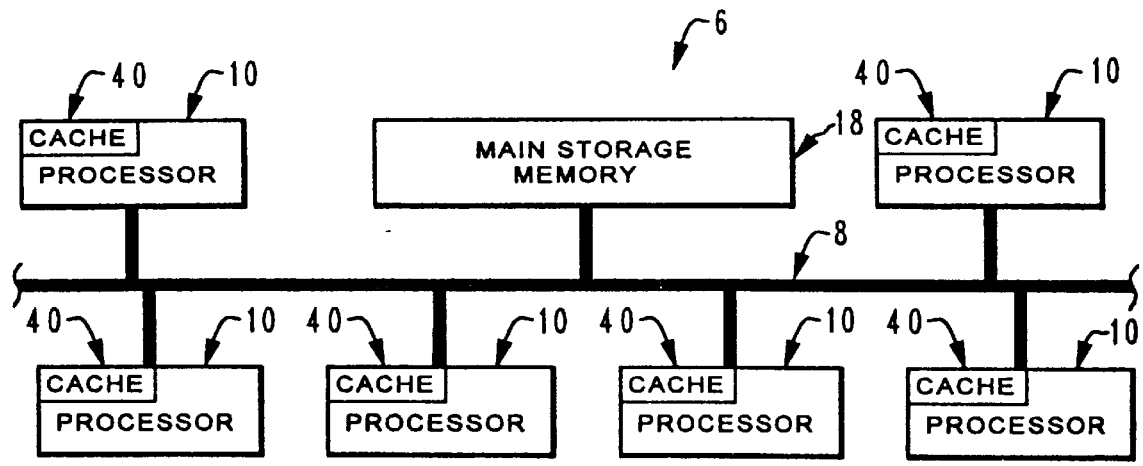
FIG. 1 is a high level block diagram depicting a multiprocessor data processing system which may be utilized to implement the method and system of the present invention.

With reference now to the figures and in particular with reference to FIG. 1, there is depicted a high level block diagram illustrating a multiprocessor data processing system 6 which may be utilized to implement the method and system of the present invention. As illustrated, multiprocessor data processing system 6 may be constructed utilizing multiscalar processors 10 which are each coupled to system memory 18 utilizing bus 8. In a tightly-coupled symmetric multiprocessor system, such as multiprocessor data processing system 6, each processor 10 within multiprocessor data processing system 6 may be utilized to read from and write to memory 18. Thus, systems and interlocks must be utilized to ensure that the data and instructions within memory 18 remain coherent.

As illustrated within FIG. 1, and as will be explained in greater detail herein, each processor 10 within multiprocessor data processing system 6 includes a cache memory 40 which may be utilized to efficiently and temporarily access and store selected instructions or data from system memory 18. In view of the fact that a cache memory constitutes a memory space, it is important to maintain coherency among each cache memory 40 within multiprocessor data processing system 6 in order to assure accurate operation thereof.

Figure 2:
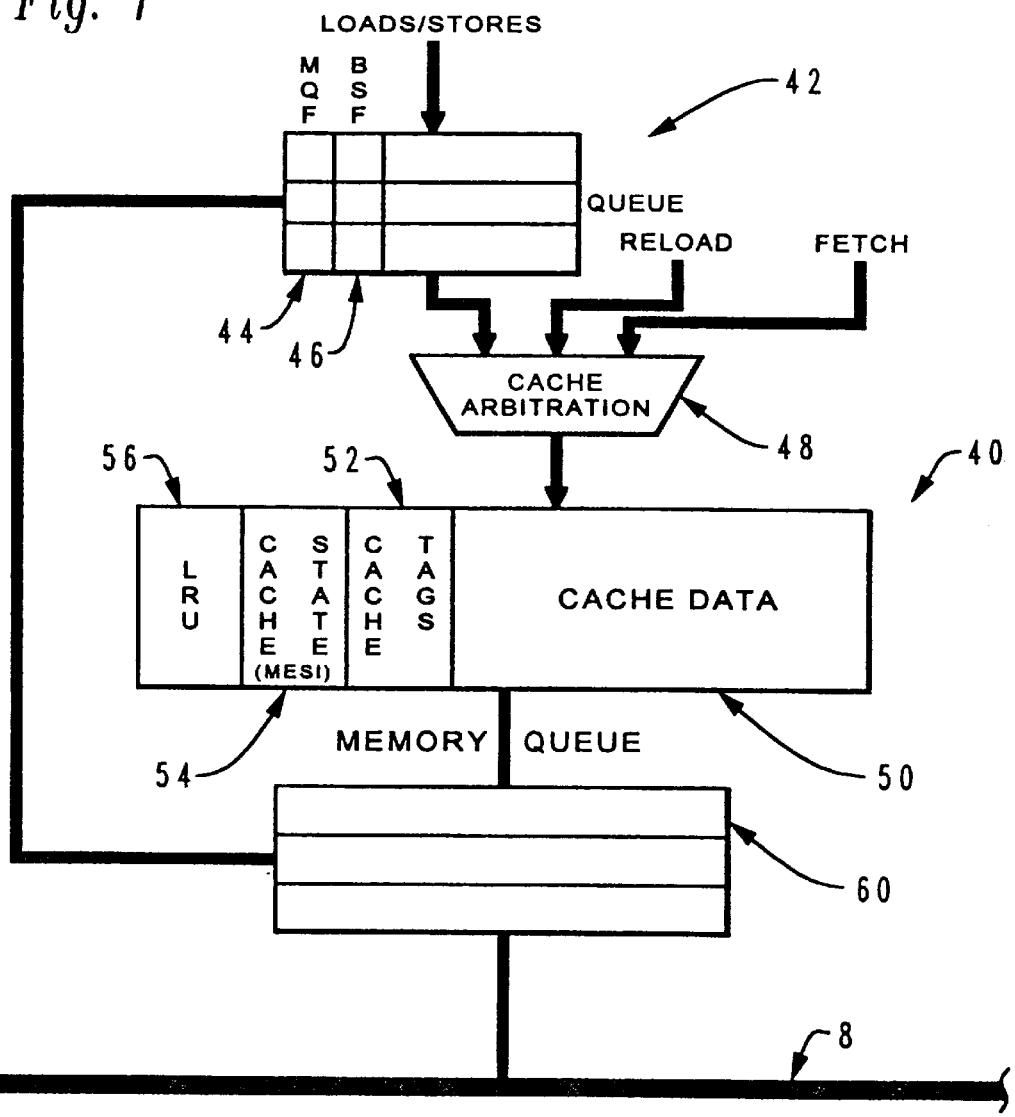
FIG. 2 is a high level block diagram of cache memory/bus interface in the multiprocessor data processing system of FIG. 1.

Referring now to FIG. 2, there is depicted a high level block diagram of a cache memory/bus interface in the multiprocessor data processing system of FIG. 1. As illustrated, cache memory 40 is coupled to bus 8 via a memory queue 60. In accordance with an important feature of the present invention, loads and stores to cache memory 40 are coupled to cache memory 40 via input queue 42. A memory queue flag and bus synchronization flag are provided and the state of each of these multistate flags is listed for each entry within input queue 42 within columns 44 and 46 respectively. Access to cache memory 40 is obtained through cache arbitration control 48, in a manner well known to those having ordinary skill in the art.

As depicted within cache memory 40, a plurality of cache tags 52 are generally provided. Each cache tag is utilized to designate and control access to cache data 50 within cache memory 40. Additionally, cache state section 54 is also depicted within cache memory 40. Cache state section 54 is utilized to provide an indication of the cache state for each entry within cache memory 40. In the depicted embodiment of the present invention a four state cache protocol typically referred to as "MESI" is utilized. Those having skill in the art will appreciate that each of these four letters corresponds to a particular state for data within cache memory 40. Thus, the four states are "modified"; "exclusive"; "shared"; and, "invalid". Additionally, a least recently used protocol 56 is also depicted within cache memory 40. Least recently used protocol 56 is utilized, as those having ordinary skill in the art will appreciate, to determine what data must be removed from cache memory 40 if additional data is to be entered into cache memory 40 as a result of required data not being present within the cable.

As stated above, the sizing and control of cache memories is a well recognized specialty within the data processing art and not addressed herein. As will be explained in greater detail below, the memory queue flag contained within column 44 and bus synchronization flag contained within column 46 of input queue 42 may be utilized to greatly enhance the maintenance of data coherency within each cache memory 40 and within main storage memory 18, within multiprocessor data processing system 6 (see FIG. 1).

Figure 3:
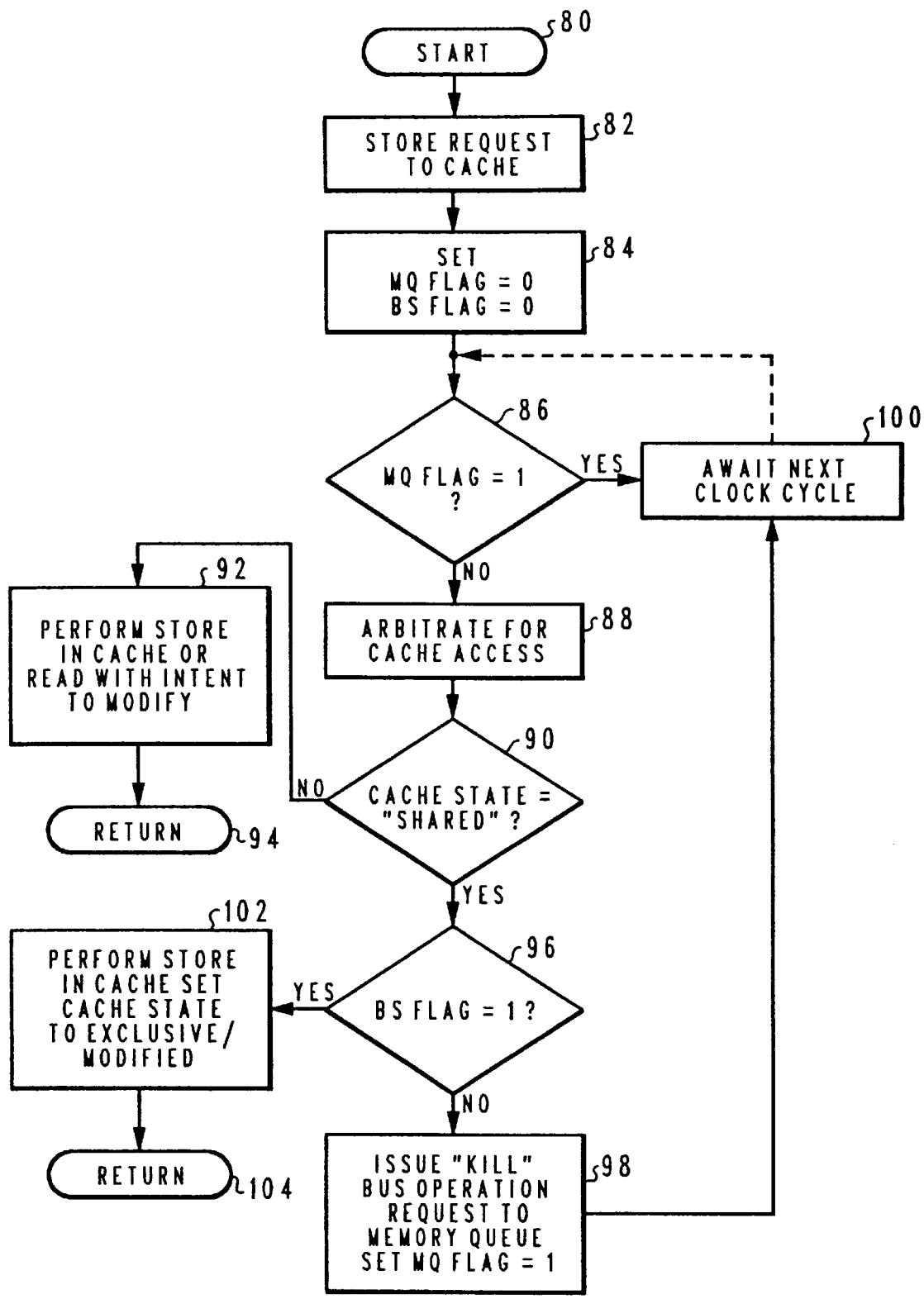
FIG. 3 is a high level logic flowchart illustrating a process for cache synchronization during a store of data to cache memory in accordance with the method and system of the present invention.

With reference now to FIG. 3, there is depicted a high level logic flowchart which illustrates a process for cache synchronization during a store of data to cache memory, in accordance with the method and system of the present invention. As depicted, this process begins at block 80 and thereafter passes to block 82. Block 82 illustrates the receipt of a store request to the cache memory. For purposes of this illustration it will be assumed that the data to be stored within the cache is not cache inhibited or designated as write-through data. Thereafter, the process passes to block 84. Block 84 illustrates the setting of both the memory queue flag and bus synchronization flag to "0." In the depicted embodiment of the present invention each multistate flag described herein constitutes a single binary digit which may, as those skilled in the art appreciate, constitute either a "0" or a "1."

Next, the process passes to block 86. Block 86 illustrates a determination of whether or not the memory queue flag is set equal to "1." Of course, during the initial processing of a store request to cache the memory queue flag will be equal to "0." Thus, the process then passes to block 88. Block 88 illustrates the arbitration for cache access, utilizing cache arbitration control 48 (see FIG. 2). Next, the process passes to block 90. Block 90 illustrates a determination of whether or not the cache state for this particular data is "shared." That is, additional copies of the data exists within the cache memories associated with other processors. If not, the process passes to block 92. Block 92 illustrates the performance of the store within the cache memory or the issuance of a Read With Intent To Modify (RWITM) onto bus 8 (see FIG. 1) if that data is not presently within cache memory 40. In situations in which the data is not shared with other processors the storage of this data to the cache will be accomplished promptly, if the data is stored within the cache. Alternately, if the data is not present within the cache the data must be read from main storage memory, modified and then written to the cache. Thereafter, the process passes to block 94 and terminates.

Referring again to block 90, in the event the cache state for the selected data is "shared," that is, the data is present within more than one cache memory associated with a processor within multiprocessor data processing system 6, the process passes to block 96. Block 96 illustrates a determination of whether or not the bus synchronization flag is equal to "1." Of course, during an initial attempt at a store, as described above, the bus synchronization flag will be set equal to "0" and thus, the process will pass to block 98.

Block 98 illustrates the issuance of a "KILL" bus operation request to memory queue 60 (see FIG. 2) and the setting of the memory queue flag equal to "1." Thereafter, the process passes to block 100. Block 100 illustrates the awaiting of the next clock cycle and therefore the continued testing of the state of the memory queue flag. In a manner which will be described in greater detail herein, the issuance of the bus operation request onto the bus will result in a resetting of the memory queue flag, permitting the process to continue. However, until such time as the bus operation has been issued to the bus, on an opportunistic basis, the process will continue to iterate between block 86 and block 100, permitting additional operations to occur within cache memory 40 during the pendency of that bus operation request.

As will be described in greater detail herein, upon the issuance of the bus operation request to the bus and the successful assertion of that operation, indicating that alternate copies of the selected data have been invalidated, the memory queue flag will be set to "0" and bus synchronization flag will be set equal to "1" and the process will pass from block 96 to block 102. Block 102 illustrates the performance of the store within the cache memory and the setting of the cache state for that selected data to "exclusive modified" indicating that exclusive ownership of that data lies with the initiating processor and that the data has been modified. Thereafter, the process passes to block 104 and terminates.

Figure 4:
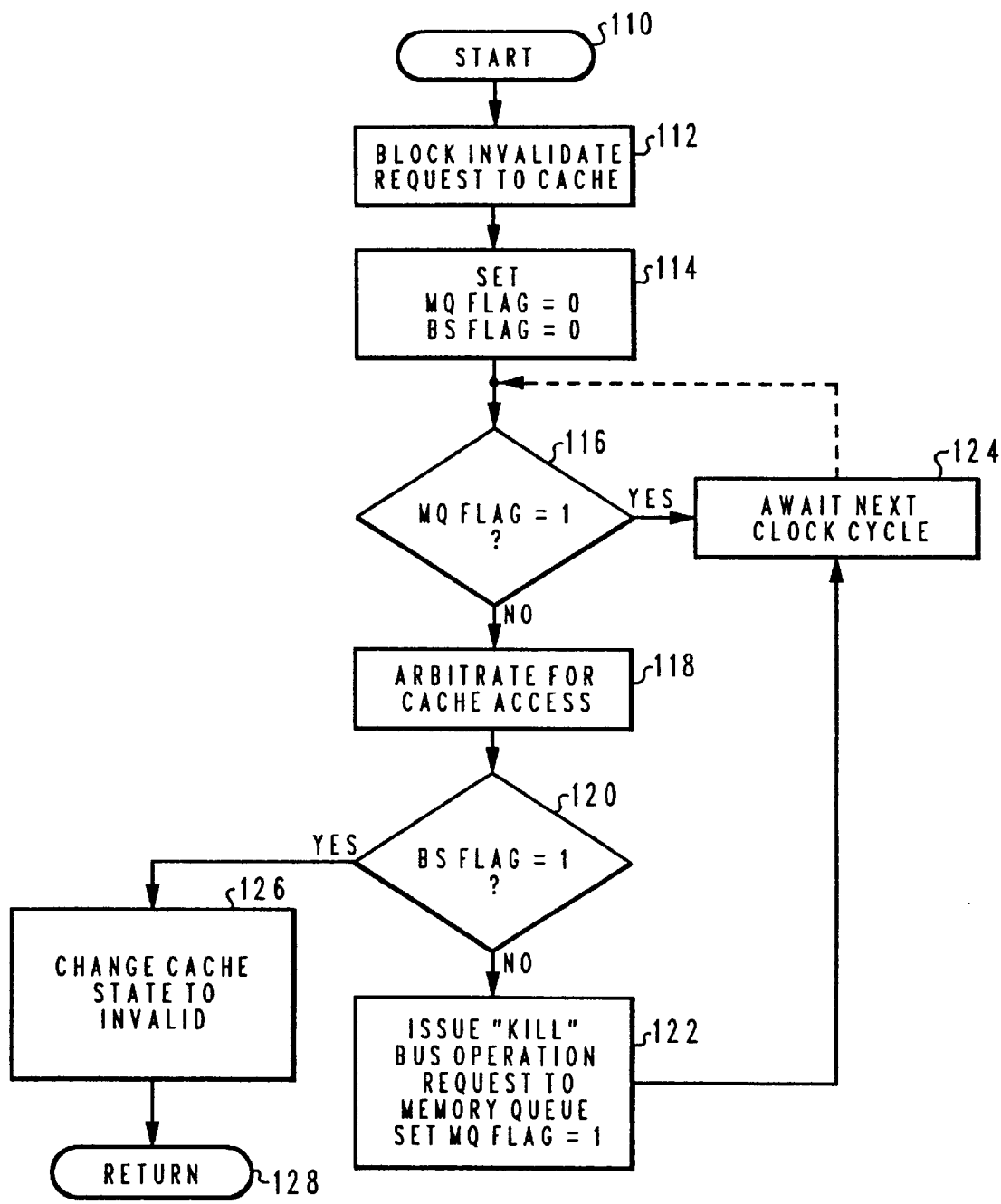
FIG. 4 is a logic flowchart illustrating a process for cache synchronization during a block invalidation of data within cache memory in accordance with the method and system of the present invention.

Referring now to FIG. 4, there is depicted a logic flowchart which illustrates a process for cache synchronization during a block invalidation of data within cache memory 40 in accordance with the method and system of the present invention. As described above, this process begins at block 110 and thereafter passes to block 112. Block 112 illustrates the receipt of a block invalidation request at the cache memory. Thereafter, the process passes to block 114. Block 114 illustrates the setting of both the memory queue and bus synchronization flags equal to "0" and the process then passes to block 116.

Block 116 illustrates a determination of whether or not the memory queue flag is equal to "1." As described with respect to FIG. 3, during an initial attempt at invalidating a block of data, the memory queue flag will still be set equal to "0" and the process will then pass to block 118. Block 118 illustrates arbitration for cache access, utilizing cache arbitration control 48 (see FIG. 2). Next, the process passes to block 120. Block 120 illustrates a determination of whether or not the bus synchronization flag is equal to "1." Of course, the bus synchronization flag will initially be equal to "0" and thus the process passes to block 122. Block 122 illustrates the issuing of the "KILL" bus operation request to memory queue 60 (see FIG. 2) for transmittal on an opportunistic basis onto bus 8. Additionally, block 122 illustrates the setting of the memory queue flag equal to "1."

Next, the process passes to block 124. As described above, block 124 illustrates the waiting for the next clock cycle and the determination thereafter of whether or not the memory queue flag is still equal to "1." Thereafter, the process continues in an iterative fashion between blocks 116 and block 124 until such time as the "KILL" bus operation request has been transmitted onto the bus. As will be described in greater detail herein, if the "KILL" bus operation request is successfully asserted on the bus, the bus synchronization flag will be set equal to "1" and the memory queue flag will be set equal to "0." Thus, the process will proceed to block 120 and thereafter pass to block 126. Block 126 illustrates the changing of the cache state to invalid, invalidating the designated block of data. Thereafter, the process passes to block 128 and terminates. Alternately, if the "KILL" bus operation request is not successfully asserted the bus synchronization flag and memory queue flag will remain set equal to "0" and the "KILL" bus operation request must be reasserted.

Figure 5:
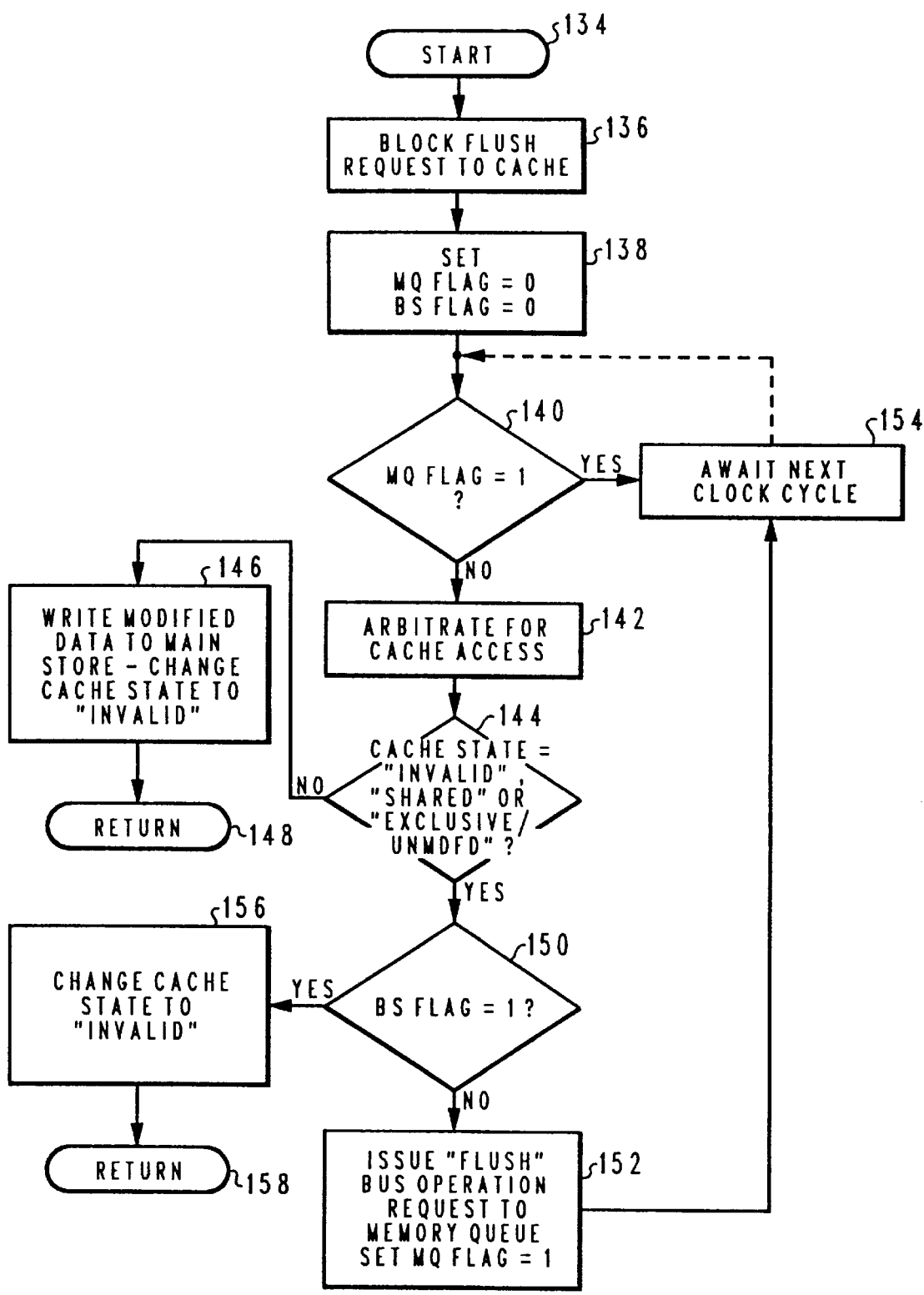
FIG. 5 is a logic flowchart illustrating a process for cache synchronization during a block flush of data within cache memory in accordance with the method and system of the present invention.

With reference now to FIG. 5, there is depicted a logic flowchart illustrating a process for cache synchronization during a block flush of data within cache memory in accordance with the method and system of the present invention. As those skilled in the art will appreciate, a so-called "flush" operation requires that clean/unmodified data to be invalidated within the cache and that the state for that data is changed to "invalid." If the data is presently modified or "dirty," the modified data is written back to main storage and the cache state is thereafter changed to "invalid."

As with the processes described above, this process begins at block 134 and thereafter passes to block 136. Block 136 illustrates the receipt of a block flush request at the cache memory. Thereafter, as described above, the memory queue and bus synchronization flags are set equal to "0." Next, the process passes to block 140. Block 140 illustrates the determination of whether or not the memory queue flag is equal to "1" and if not, as will be the case with the initial attempt at asserting a block flush command, the process will pass to block 142. Block 142 illustrates the arbitration for cache access utilizing cache arbitration control 48 (see FIG. 2).

Next, the process passes to block 144. Block 144 illustrates a determination of whether or not the cache state for the selected data is "invalid," "shared" or "exclusive/unmodified." If not, the process passes to block 146. Block 146 illustrates the writing of the modified data to main storage and the changing of the cache state to "invalid." Thereafter, the process passes to block 148 and terminates.

Referring again to block 144, in the event the cache state is equal to "invalid," "shared" or "exclusive/unmodified," the process passes to block 150. Block 150 illustrates a determination of whether or not the bus synchronization flag is equal to "1." During the initial attempt at asserting a block flush request to the cache memory the bus synchronization flag will be equal to "0" and thus the process will pass to block 152. Block 152 illustrates the issuance of the "flush" bus operation request onto memory queue 60 (see FIG. 2) and the setting of the memory queue flag equal to "1." Thereafter, the process passes to block 154, as described above, to continue to await the completion of the "flush" bus operation onto bus 8. Thereafter, the memory queue flag will be reset equal to "0" and the process will be released from the loop formed by blocks 140 and 154. In the event the "flush" bus operation request was successfully asserted, the bus synchronization flag will be set equal to "1" and thus, after the determination depicted within block 150, the process will pass to block 156. Block 156 illustrates the changing of the state for the selected data within the cache to invalid and the process then terminates, as depicted at block 158. Again, if the "flush" bus operation request is not successfully completed, the bus synchronization flag will not be set equal to "1" and the flush bus operation must be reattempted, as depicted at block 152.

Figure 6:
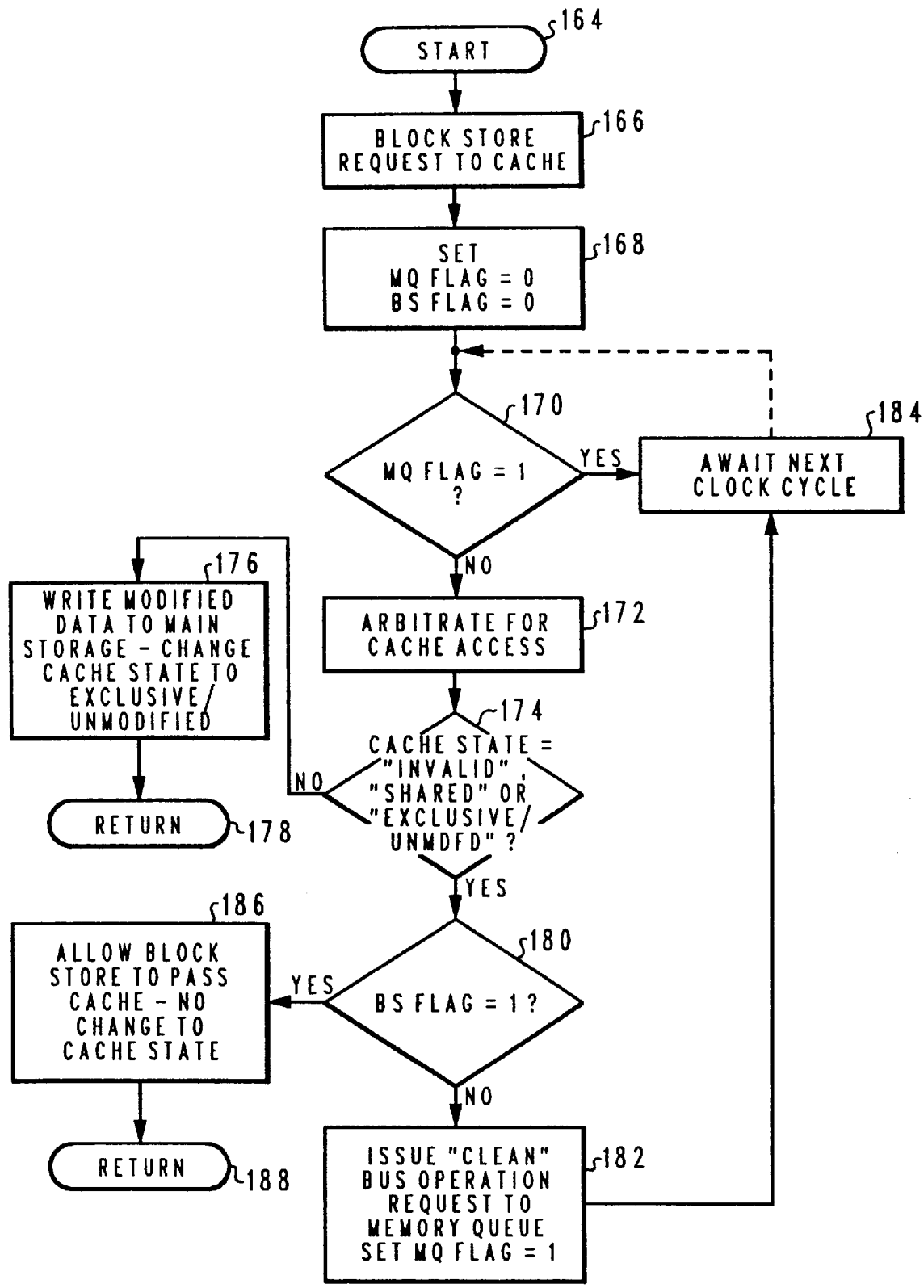
FIG. 6 is a logic flowchart illustrating a process for cache synchronization during a block store of data within cache memory in accordance with the method and system of the present invention.

Referring now to FIG. 6, there is depicted a logic flowchart illustrating a process for cache synchronization during a block store of data within cache memory in accordance with the method and system of the present invention. As described above, the process begins at block 164 and thereafter passes to block 166. Block 166 illustrates the receipt of the block store request at cache memory 40 and the process then passes to block 168. Block 168 illustrates the setting of the memory queue and bus synchronization flags equal to "0" and the process then passes to block 170. In a manner identical to that described above, block 170 illustrates a determination of whether or not the memory queue flag is equal to "1" and if not, as will occur during the initial attempt to assert the block store request, the process passes to block 172. Block 172 illustrates the arbitration for cache access utilizing cache arbitration control 48 (see FIG. 2).

Next, the process passes to block 174. Block 174 illustrates a determination of the cache state for the selected data. Thus, if the cache state is not equal to "invalid," "shared" or "exclusive/unmodified," the process passes to block 176. Block 176 illustrates the writing of the modified data to main storage and the changing of the cache state for the selected data to "exclusive/unmodified." Thereafter, the process passes to block 178 and terminates.

Still referring to block 174, in the event the cache state for the selected data is equal to "invalid," "shared" or "exclusive/unmodified," the process passes to block 180. Block 180 illustrates a determination of whether or not the bus synchronization flag is equal to "1." Of course, during the initial attempt to assert the block store request within cache memory 40, the bus synchronization flag will be equal to "0." Thus, the process passes to block 182. Block 182 illustrates the issuance of a "clean" bus operation request to memory queue 60 (see FIG. 2). Those having skill in the art will appreciate that a "clean" bus operation request requires modified or "dirty" data to be written to main storage and the state of the associated data to change to "exclusive/unmodified." If the data is unmodified or "clean" no change is required.

Thereafter, the process passes to block 184. Block 184 illustrates the waiting until the next clock cycle, and the continued determination of whether or not the "clean" bus operation request has been transmitted to bus 8. Upon the successful transmission of the "clean" bus operation request the state of the memory queue flag will be set to "0" and the process will be removed from the loop formed by blocks 170 and block 184. If the assertion of the "clean" bus operation request was successful, the bus synchronization flag state will also be set equal to "1" and the process will then pass from block 180 to block 186. Block 186 illustrates the allowance of the data cache block store operation to pass the cache and no state changes are made to the cache. Thereafter, the process passes to block 188 and terminates.

Upon reference to the preceding three logic flowcharts those skilled in the art will appreciate that by establishing a memory queue and bus synchronization flag within each processor the transmission of an appropriate bus operation request from that processor to the bus prior to the modification of selected portions of the data may be downloaded to the memory queue, permitting additional cache operations to take place during the pendency of that bus operation request. Thereafter, if the bus operation request is transmitted unsuccessfully, the memory queue flag will have been reset; however, the bus synchronization flag will not have been reset, as will be described in greater detail below, and the appropriate bus operation request must be reissued to memory queue. Upon the successful assertion of the appropriate bus operation request, the modification of the data will take place along with the modification, if necessary, of the cache state for that selected data.

Additionally, upon a review of the foregoing those skilled in the art will appreciate that the cache synchronization technique described herein may be utilized to successfully synchronize additional operations within a multiprocessor data processing system. For example, a synchronization process wherein memory queue and subsequent levels of cache must complete any outstanding loads or stores prior to permitting execution units to continue may also be synchronized utilizing the method and system of the present invention. Similarly, a Translation Lookaside Buffer (TLB) invalidate operation may also be synchronized utilizing the method and system of the present invention, since a Translation Lookaside Buffer (TLB) constitutes a cache into page table entries within a memory system. Similarly, a Block Zero bus operation in which a block of data is set equal to zero may also be synchronized utilizing the method and system of the present invention. Those skilled in the art will appreciate that the technique described herein for synchronizing bus operations with cache operations associated with a particular processor may be implemented utilizing the present method and system.

Figure 7:
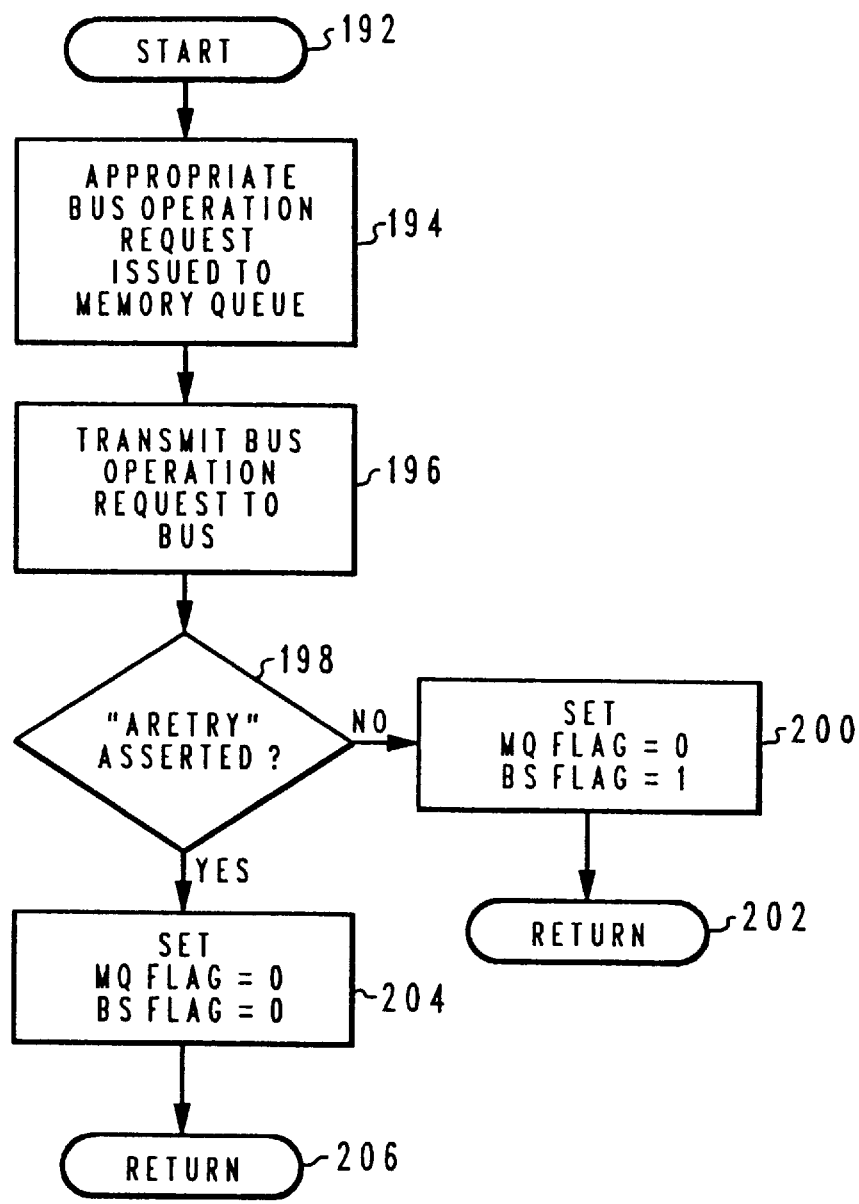
FIG. 7 is a high level logic flowchart illustrating a process for cache synchronization utilizing a memory queue in accordance with the method and system of the present invention.

Finally, with reference to FIG. 7, there is depicted a high level logic flowchart which illustrates the process for cache synchronization utilizing a memory queue, in accordance with the method and system of the present invention. As illustrated, this process begins at block 192. Thereafter, the process passes to block 194. Block 194 illustrates the issuance of the appropriate bus operation request to memory queue 60 (see FIG. 2). Thereafter, the process passes to block 196.

Block 196 illustrates the transmittal of the bus operation request onto bus 8 and the process then passes to block 198. Block 198 illustrates a determination of whether or not an alternate processor within multiprocessor data processing system 6 has asserted an "ARETRY," signal, indicating that data coherency problems prohibit the granting of the required bus operation request. If an alternate processor has not asserted the "ARETRY" signal the process passes to block 200. Block 200 illustrates the resetting of the memory queue flag to "0" and the setting of the bus synchronization flag to "1," indicating that the bus operation may take place and the data may be modified. Thereafter, the process passes to block 202 and terminates.

Referring again to block 198, in the event an alternate processor within multiprocessor data processing system 6 has asserted the "ARETRY" signal, indicating that data coherency problems exist, the process passes to block 204. Block 204 illustrates the setting of the memory queue flag equal to "0" and the setting of the bus synchronization flag equal to "0," indicating that the appropriate bus operation request must be reasserted from cache memory 40. Thereafter, the process passes to block 206 and terminates.

Upon reference to the foregoing those skilled in the art will appreciate that the Applicants in the present application have described a system which may be efficiently utilized to maintain data coherency between main storage memory and multiple cache memories in a multiprocessor data processing system by synchronizing the bus which couples multiple processors together with a flag which is maintained within each processor. By synchronizing the bus activities with the cache activities of a single processor the coherency of data within multiple cache memories may be selectively and efficiently maintained.

While the invention has been particularly shown and described with reference to a preferred embodiment, it will be understood by those skilled in the art that various changes in form and detail may be made therein without departing from the spirit and scope of the invention.

We claim:

1. A method in a multiprocessor system having a plurality of processors coupled together via a common bus for efficient maintenance of data coherency among main storage and multiple cache memories within said multiprocessor system, said method comprising the steps of:

establishing a multistate bus synchronization flag within a selected one of said plurality of processors in response to an attempted modification of selected data within said multiprocessor system by said selected one of said plurality of processors;

thereafter issuing an appropriate bus operation request from a cache memory associated with said selected one of said plurality of processors to a memory queue associated with that cache memory;

transmitting said appropriate bus operation request onto said common bus from said memory queue on an opportunistic basis wherein additional operations may occur within said cache memory during pendency of said appropriate bus operation request;

altering a state of said multistate bus synchronization flag in response to a successful assertion of said appropriate bus operation request;

altering said selected data only in response to said altered state of said multistate bus synchronization flag; and automatically reissuing said appropriate bus operation request in response to a failure to alter said state of said multistate bus synchronization flag after completion of said appropriate bus operation.

2. The method in a multiprocessor system having a plurality of processor coupled together via a common bus for efficient maintenance of data coherency according to claim 1, further including the step of establishing a multistate memory queue flag in response to said completion of said appropriate bus operation from said cache memory associated with said selected one of said plurality of processors to said memory queue associated therewith.

3. The method in a multiprocessor system having a plurality of processor coupled together via a common bus for efficient maintenance of data coherency according to claim 2, further including the step of altering a state of said multistate memory queue flag in response to said completion of said appropriate bus operation.

4. The method in a multiprocessor system having a plurality of processor coupled together via a common bus for efficient maintenance of data coherency according to claim 1, wherein said step of issuing an appropriate bus operation request from a cache memory associated with said selected one of said plurality of processors to a memory queue associated therewith comprises the step of issuing a kill operation request to invalidate alternate copies of said selected data.

5. The method in a multiprocessor system having a plurality of processor coupled together via a common bus for efficient maintenance of data coherency according to claim 1, wherein said step of issuing an appropriate bus operation request from a cache memory associated with said selected one of said plurality of processors to a memory queue associated therewith comprises the step of issuing a clean operation request to copy only modified versions of said selected data from alternate cache memories to said main storage.

6. The method in a multiprocessor system having a plurality of processor coupled together via a common bus for efficient maintenance of data coherency according to claim 1, wherein said step of issuing an appropriate bus application request from a cache memory associated with said selected one of said plurality of processor comprises the step of issuing a flush operation request to copy only modified versions of said selected data to said main storage and thereafter invalidating all alternate copies of said selected data.

7. A system for efficient maintenance of data coherency among main storage and multiple cache memories within a multiprocessor system having a plurality of processors coupled together via a common bus, said system comprising:

means for establishing a multistate bus synchronization flag within a selected one of said plurality of processors in response to an attempted modification of selected data within said multiprocessor system by said selected one of said plurality of processors;

means for issuing an appropriate bus operation request from a cache memory associated with said selected one of said plurality of processors to a memory queue associated with that cache memory;

means for transmitting said appropriate bus operation request onto said common bus from said memory queue on an opportunistic basis wherein additional operations may occur within said cache memory during pendency of said appropriate bus operation request;

means for altering a state of said multistate bus synchronization flag in response to a successful assertion of said appropriate bus operation request;

means for altering said selected data only in response to said altered state of said multistate bus synchronization flag; and means for automatically reissuing said appropriate bus operation request in response to a failure to alter said state of said multistate bus synchronization flag after completion of said appropriate bus operation.

8. The system for efficient maintenance of data coherency among main storage and multiple cache memories within a multiprocessor system according to claim 1, further including means for establishing a multistate memory queue flag in response to said completion of said appropriate bus operation request from said cache memory associated with said selected one of said plurality of processors to said memory queue associated therewith.

9. The system for efficient maintenance of data coherency among main storage and multiple cache memories within a multiprocessor system according to claim 8, further including means for altering a state of said multistate memory queue flag in response to said completion of said appropriate bus operation.

10. The system for efficient maintenance of data coherency among main storage and multiple cache memories within a multiprocessor system according to claim 7, wherein said means for issuing an appropriate bus operation request from a cache memory associated with said selected one of said plurality of processors to a memory queue associated therewith comprises means for issuing a kill operation request to invalidate alternate copies of said selected data.

11. The system for efficient maintenance of data coherency among main storage and multiple cache memories within a multiprocessor system according to claim 7, wherein said means for issuing an appropriate bus operation request from a cache memory associated with said selected one of said plurality of processors to a memory queue associated therewith comprises means for issuing a clean operation request to copy only modified versions of said selected data from alternate cache memories to said main storage.

12. The system for efficient maintenance of data coherency among main storage and multiple cache memories within a multiprocessor system according to claim 7, wherein said means for issuing an appropriate bus application request from a cache memory associated with said selected one of said plurality of processor comprises the step of issuing a flush operation request to copy only modified versions of said selected data to said main storage and thereafter invalidating all alternate copies of said selected data.

* * * * *